(12) United States Patent
Steadman

(10) Patent No.: US 6,561,582 B1
(45) Date of Patent: May 13, 2003

(54) SUPPORT APPARATUS

(76) Inventor: William David Steadman, 2166 SE. Pyramid Rd., Port Saint Lucie, FL (US) 34952

( * ) Notice: Subject to any disclaimer, the term of this patent is extended or adjusted under 35 U.S.C. 154(b) by 0 days.

(21) Appl. No.: 09/697,242

(22) Filed: Oct. 26, 2000

(30) Foreign Application Priority Data

Nov. 13, 1999 (GB) .............................................. 9926914

(51) Int. Cl.[7] ................................................ B60N 2/28
(52) U.S. Cl. ................................ 297/250.1; 297/188.2; 297/256.16
(58) Field of Search ......................... 297/250.1, 256.16, 297/188.01, 188.2; 5/634

(56) References Cited

U.S. PATENT DOCUMENTS

| 1,151,894 A | * | 8/1915 | Meinecke | ...................... 5/648 |
| 3,265,437 A | * | 8/1966 | Mincieli | .................. 297/250.1 |
| 3,452,372 A | * | 7/1969 | Emery | ........................... 5/634 |
| 4,448,292 A | * | 5/1984 | Comfort | ..................... 190/107 |
| 4,522,288 A | * | 6/1985 | Wickman et al. | ........... 190/106 |
| 5,346,279 A | * | 9/1994 | Pecorella | ............... 297/256.13 |
| 5,899,529 A | | 5/1999 | Chaucer | .................. 297/250.1 |
| 6,299,249 B1 | * | 10/2001 | Mori | ...................... 297/256.13 |

FOREIGN PATENT DOCUMENTS

| EP | 0197910 A2 | 4/1986 | |
| EP | 0479151 A1 | 9/1991 | |
| GB | 16455 | * 7/1915 | ..................... 5/634 |

* cited by examiner

Primary Examiner—Peter R. Brown
(74) Attorney, Agent, or Firm—Watts, Hoffmann, Fisher & Heinke Co., L.P.A.

(57) ABSTRACT

A support apparatus 10 suitable for supporting a child's car seat 12 on a vehicle seat 14, such that the seat 12 has a required inclination. The apparatus 10 includes first and second planar members 16, 18 pivotally interconnected along one edge by a hinge arrangement 20. A bracing arrangement is engageable between the first and second members 16, 18 to provide a required relative inclination, and hence inclination of the seat 12.

18 Claims, 1 Drawing Sheet

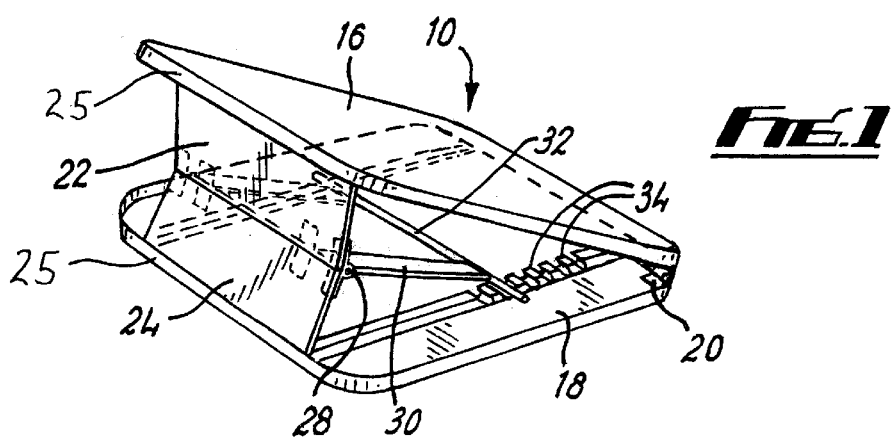
FIG.1
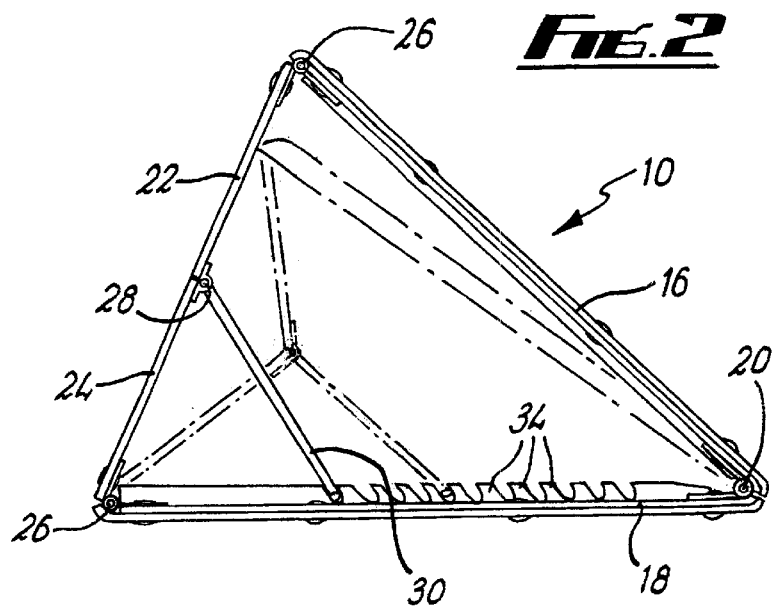
FIG.2
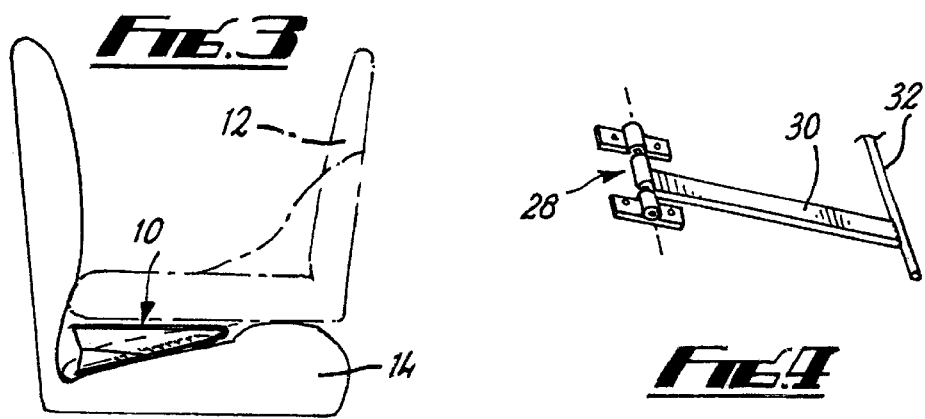
FIG.3
FIG.4

SUPPORT APPARATUS

This invention concerns support apparatus and particularly but not exclusively support apparatus for a child's car seat; and a method of mounting a child's car seat in a vehicle.

Conventionally babies and young children are carried in vehicles and particularly cars on a child's car seat. Such seats generally rest on the vehicle seat and are strapped thereto or held in place by the vehicle's seat belt. For young babies such seats are often rear facing, whilst seats for older children are generally forward facing. With such car seats, and particularly the seats for babies, it is intended for the seats to rest at a particular inclination, and this is often with the base of the car seat horizontally aligned. The inclination of vehicle's seats varies from vehicle to vehicle, and sometimes between front and rear seats. Accordingly, in many instances children are carried at an incorrect inclination such that the child seat does not provide the desired comfort, support or security for the child.

The term "child's car seat" when used in this specification is to be understood as covering seats as outlined above for use in cars and/or other vehicles.

According to the present invention there is provided support apparatus, the apparatus comprising first and second members each providing a respective support surface, the first and second members being pivotally interconnected such that the relative inclination between said members can be varied, the apparatus being locatable on a vehicle seat to support a child's car seat thereon.

The first and second members are preferably interconnected along respective first edges thereof. The first and second members may be substantially planar.

The apparatus may comprise a support arrangement engageable between the first and second members to maintain a required relative inclination.

The support assembly may be arranged to permit one of a number of relative inclinations to be selectively maintained. The support arrangement may extend between respective opposite second edges of the first and second members.

The support arrangement may comprise a first part extending from the first member and a second part extending from the second member, the first and second parts being pivotally interconnected, and desirably movable between a substantially collinear alignment providing maximum relative inclination, and a substantially parallel alignment with the first and second members substantially parallel to each other, whereby to permit storage.

The first and second parts may be substantially planar and may be narrower than the first and second members.

A bracing arrangement preferably extends between the support arrangement and a one of the first and second members, to retain a required relative inclination. The bracing arrangement may extend from the interconnection between said first and second parts, and the bracing arrangement may be pivotally mounted to said interconnection.

The bracing arrangement may comprise one or more elongate members, and where a plurality of elongate members are provided they may be interconnected and may be provided in a parallel alignment. A plurality of formations may be provided on said one of the first or second members, with which formations the bracing arrangement is selectively engageable.

The first and second members may be formed of plastics material mouldings, and the formations may be integrally formed with said one of the first or second members.

The first and second members preferably have a width in the order of the width of the underside of a child's car seat.

The invention also provides a child's car seat incorporating a support apparatus according to any of the preceding paragraphs on the underside of the car seat.

The apparatus may be integrally formed with a part of the car seat.

The invention also provides a method of mounting a child's car seat in a vehicle, the method comprising locating a support apparatus according to any of said preceding ten paragraphs on a vehicle seat, adjusting the relative inclination between the first and second members to a required amount, locating the car seat on the support apparatus and mounting the car seat to the car.

An embodiment of the present invention will now be described by way of example only and with reference to the accompanying drawings, in which:

FIG. 1 is a diagrammatic perspective view of a support apparatus according to the invention;

FIG. 2 is a diagrammatic side view of the apparatus of FIG. 1;

FIG. 3 is a diagrammatic side view of the apparatus of FIG. 1 in use; and

FIG. 4 is a perspective view of part of the apparatus of FIG. 1.

The drawings show a support apparatus 10 suitable for supporting a child's car seat 12 on a vehicle seat 14, such that the seat 12 is at a required inclination. The apparatus 10 comprises first and second planar members 16, 18. The members each include a permitral flange 25, FIG. 1. The members 16, 18 are pivotally interconnected along one edge by a hinge arrangement 20. The opposite edges of the members 16, 18 are interconnected by support structure in the form of third and fourth planar members 22, 24. The planar members are pivotally connected respectively to the first and second planar members 16, 18 by hinges 26, and are interconnected by a hinge arrangement 28.

A bracing arrangement is provided in the form of a pair of elongate members 30 interconnected by a locating element in the form of a crossbar 12. The elongate members 30 are pivotally mounted to the hinge arrangement 28 respectively adjacent each end of the members 22, 24. A plurality of coacting elements or engagement formations in the form of inclined recesses are provided extending two lines on the second planar member 18, with the recesses 34 inclined away from the hinge 20.

During storage the crossbar 32 is not engaged in any of the recesses 34 but rather extends towards the hinge 20, and consequently the planar members 16, 18 lie substantially on each other such that the supporting structure is within a cavity defined by the members 16, 18.

The apparatus 10 then can then be located towards the back of the vehicle seat 14 as shown in 10 and the child's car seat 12 located thereon and strapped into the vehicle. FIG. 2 shows the maximum inclination between the members 16,18 and also a lesser inclination in dotted lines. The first and second planar members 16, 18 may be made from plastic material mouldings and the recesses 34 can be integrally formed therewith.

There is thus described support apparatus which permits a child's car seat to be mounted at a required inclination. The apparatus is usable with a wide number of different child's car seats on differently inclined vehicle seats. The apparatus can readily be adjusted or folded to a flat arrangement for storage. The apparatus is a relatively straightforward construction and can thus be inexpensively and robustly manufactured.

Various modifications may be made without departing from the scope of the invention. For example, a different bracing arrangement may be provided. Different hinge arrangements could be provided. The apparatus could be provided on the underside of a child's car seat and may be integrally formed therewith.

What is claimed is:

1. Support apparatus locatable on a vehicle seat to support a child's car seat thereon, the apparatus comprising:
   a. first and second members each providing a respective support surface;
   b. means pivotally interconnecting said first and second members such that the relative inclination between said members can be varied;
   c. a support arrangement engageable between said first and second members to maintain a required relative inclination, said support arrangement being arranged to permit one of a number of relative inclinations to be selectively maintained;
   d. said first and second members further including respective opposite second edges, and said support arrangement extends between said respective opposite second edges of said first and second members;
   e. said support arrangement also including first and second parts, said first part extending from the first member and said second part extending from the second member, and means pivotally interconnecting said first and second parts;
   f. said first and second parts being movable between a substantially colinear alignment providing maximum relative inclination, and a substantially parallel alignment with the said first and second members substantially parallel to each other, to permit storage; and,
   g. said first and second members being substantially planar.

2. Support apparatus according to claim 1, wherein said first and second parts are narrower than said first and second members.

3. Support apparatus according to claim 2, wherein a bracing arrangement extends between said support arrangement and a one of said first and second members, to retain a required relative inclination.

4. Support apparatus according to claim 3, wherein said bracing arrangement extends from said interconnection means between said first and second parts.

5. Support apparatus according to claim 4, wherein means are provided for pivotally mounting said bracing arrangement to said interconnection.

6. Support apparatus according to claim 5, wherein said bracing arrangement comprises an elongate member.

7. Support apparatus according to claim 6, wherein said bracing arrangement comprises a plurality of elongate members.

8. Support apparatus according to claim 7, wherein means are provided for interconnecting said plurality of elongate members.

9. Support apparatus according to claim 8, wherein said plurality of elongate members are provided in a parallel alignment.

10. Support apparatus according to claim 9, wherein a plurality of formations are provided on said one of said first or second members, with which formations said bracing arrangement is selectively engageable.

11. Support apparatus according to claim 10, wherein said first and second members are formed of plastics material mouldings.

12. Support apparatus according to claim 11, wherein said formations are integrally formed with said one of said first or second members.

13. In combination a child's car seat and a support according to claim 1 wherein the support is adjacent an underside of the car seat.

14. A child's car seat and a support in combination according to claim 13, wherein the support is integrally formed as a part of the car seat.

15. A support for a child's seat comprising:
   a. a pair of support members each including a planar support part and a perimetral flange;
   b. a hinge connected to the flanges along respective sides of the members for providing articulation between a closed storage position and a plurality of use positions;
   c. a spaced pair of articulated supports pivotally connected to the flanges at locations opposite the hinge;
   d. a locating element connected to the supports;
   e. one of the members including a plurality of coacting elements spaced longitudinally as measured in a direction between the hinge and the supports;
   f. the locating element being coactable with the coacting elements to maintain the members in each of the use positions selectively and one at a time;
   g. the members defining an internal cavity when in the storage position; and,
   h. the supports and the elements being within the cavity when the members are in the storage position.

16. Support for a child's seat comprising:
   a) a pair of supporting members hingedly connected along respective sides for articulation between a storage position wherein the members are juxtaposed and a plurality of use positions whereat member sides opposite the connected sides are spaced;
   b) the members defining an internal cavity when in the storage position;
   c) articulated member bracing structure within the cavity when the members are in the storage position;
   d) the structure being adapted releasably to fix the members in each of the use positions; and,
   e) said structure comprising first and second parts respectively extending from the respective members and means pivotally interconnecting said first and second parts.

17. A method of mounting a child's car seat in a vehicle, the method comprising locating a support according to claim 16 on a vehicle seat, adjusting the relative inclination between said first and second members to a required amount, locating the car seat on said support apparatus and mounting the car seat to the vehicle seat.

18. A support according to claim 16 wherein said first and second parts are movable between a substantially colinear alignment providing maximum relative inclination, and a substantially parallel alignment when the members are in the storage position.

* * * * *